United States Patent
Vandike et al.

(10) Patent No.: US 12,457,934 B2
(45) Date of Patent: Nov. 4, 2025

(54) RESIDUE SENSING AND CLEANING SYSTEM

(71) Applicant: DEERE & COMPANY, Moline, IL (US)

(72) Inventors: Nathan R. Vandike, Geneseo, IL (US); Martin Unterpaintner, Saarbruecken (DE)

(73) Assignee: Deere & Company, Moline, IL (US)

( * ) Notice: Subject to any disclaimer, the term of this patent is extended or adjusted under 35 U.S.C. 154(b) by 384 days.

(21) Appl. No.: 18/151,812

(22) Filed: Jan. 9, 2023

(65) Prior Publication Data
US 2024/0224860 A1    Jul. 11, 2024

(51) Int. Cl.
*A01D 41/127* (2006.01)
*B60S 1/16* (2006.01)

(52) U.S. Cl.
CPC ..... *A01D 41/1276* (2013.01); *A01D 41/1278* (2013.01); *B60S 1/163* (2013.01)

(58) Field of Classification Search
CPC .. A01D 41/1276; A01D 41/1278; B60S 1/163
See application file for complete search history.

(56) References Cited

U.S. PATENT DOCUMENTS

| | | | |
|---|---|---|---|
| 5,706,840 A * | 1/1998 | Schneider | G01G 3/13 134/113 |
| 6,406,368 B1 | 6/2002 | Cruson et al. | |
| 6,939,221 B1 | 9/2005 | Redekop et al. | |
| 7,485,035 B1 | 2/2009 | Yde | |

(Continued)

FOREIGN PATENT DOCUMENTS

| | | |
|---|---|---|
| BR | 102021011031 A2 | 1/2022 |
| BR | 102021011709 A2 | 12/2022 |

(Continued)

OTHER PUBLICATIONS

"Better Visibility, less accidents: Keep a clear view with camera cleaning systems from Continental," https://www.continental.com/en/press/press-releases/2017-04-19-camera-cleaning/, Apr. 19, 2017, 3 pages.

*Primary Examiner* — Donald J Wallace
*Assistant Examiner* — Jalal C Coduroglu
(74) *Attorney, Agent, or Firm* — Taft Stettinius & Hollister LLP; Stephen F. Rost (57) ABSTRACT

Systems and methods for sensing accumulated residue on a transmission surface of a sensor of an agricultural machine and controlling a cleaning of the transmission surface. Using captured information obtained by the sensor through the transmission surface, a first cleanliness value can be derived and compared with a first threshold. If the first threshold is not satisfied, a cleaning system can be activated. Communication of signals generated using the captured information can also then be suspended or assigned a confidence value. Information subsequently captured by the sensor can be used to derive another cleanliness value for comparison to a second threshold. The subsequently derived cleanliness value can result in at least one of a change in the confidence value, resumption of communication of signals generated using captured information obtained by the sensor, deactivation of the cleaning system, and a change in the aggressiveness of the cleaning system.

20 Claims, 5 Drawing Sheets

(56) References Cited

U.S. PATENT DOCUMENTS

| | | |
|---|---|---|
| 9,880,382 B1 | 1/2018 | Tippy et al. |
| 10,188,036 B2 | 1/2019 | Loukili et al. |
| 10,414,383 B2 | 9/2019 | Davies et al. |
| 10,479,327 B2 | 11/2019 | Hsiao et al. |
| 2003/0190939 A1 | 10/2003 | Bueermann |
| 2005/0059445 A1 | 3/2005 | Niermann et al. |
| 2005/0194473 A1 | 9/2005 | Pearson et al. |
| 2006/0183519 A1 | 8/2006 | Benes |
| 2006/0208169 A1* | 9/2006 | Breed .................. G01S 15/88 250/221 |
| 2007/0026912 A1 | 2/2007 | Anderson et al. |
| 2007/0111766 A1 | 5/2007 | Holmen |
| 2007/0275775 A1 | 11/2007 | Farley et al. |
| 2007/0281764 A1* | 12/2007 | Schwinn .............. A01F 12/444 460/6 |
| 2008/0268927 A1 | 10/2008 | Farley et al. |
| 2009/0005137 A1 | 1/2009 | Isaac et al. |
| 2009/0111548 A1 | 4/2009 | Landuyt |
| 2009/0253474 A1 | 10/2009 | Isaac |
| 2009/0287380 A1 | 11/2009 | Chervenka et al. |
| 2009/0325659 A1 | 12/2009 | Overschelde et al. |
| 2011/0045883 A1 | 2/2011 | Weichholdt et al. |
| 2011/0045884 A1 | 2/2011 | Weichholdt et al. |
| 2011/0093169 A1 | 4/2011 | Schroeder et al. |
| 2011/0130181 A1 | 6/2011 | Roberge et al. |
| 2011/0237316 A1 | 9/2011 | Isaac et al. |
| 2011/0270495 A1 | 11/2011 | Knapp |
| 2012/0178509 A1 | 7/2012 | Eggenhaus et al. |
| 2012/0270613 A1 | 10/2012 | Isaac et al. |
| 2013/0095899 A1 | 4/2013 | Knapp |
| 2013/0324199 A1 | 12/2013 | Roberge et al. |
| 2014/0031096 A1 | 1/2014 | Isaac et al. |
| 2014/0080555 A1 | 3/2014 | Wagner et al. |
| 2014/0171160 A1 | 6/2014 | Ricketts et al. |
| 2014/0302897 A1 | 10/2014 | Isaac et al. |
| 2015/0264864 A1 | 9/2015 | Branch et al. |
| 2015/0322778 A1* | 11/2015 | Kelsall .................. E21B 47/12 340/854.4 |
| 2015/0351321 A1 | 12/2015 | Shane |
| 2015/0373913 A1 | 12/2015 | Berry |
| 2016/0088794 A1 | 3/2016 | Baumgarten et al. |
| 2016/0374267 A1 | 12/2016 | Reinecke et al. |
| 2017/0034997 A1 | 2/2017 | Mayerle |
| 2017/0071125 A1 | 3/2017 | Pfeiffer et al. |
| 2017/0086372 A1 | 3/2017 | Palla et al. |
| 2017/0086373 A1 | 3/2017 | Mahieu et al. |
| 2017/0112055 A1 | 4/2017 | Depreitere et al. |
| 2017/0142900 A1 | 5/2017 | Mahieu et al. |
| 2017/0150680 A1* | 6/2017 | Moutton ............... G01F 23/263 |
| 2017/0238463 A1 | 8/2017 | Van de Wege et al. |
| 2018/0007831 A1 | 1/2018 | Ballegeer et al. |
| 2018/0084718 A1 | 3/2018 | Baumgarten et al. |
| 2018/0092301 A1 | 4/2018 | Vandike et al. |
| 2018/0092302 A1 | 4/2018 | Vandike et al. |
| 2018/0368318 A1 | 12/2018 | Isaac et al. |
| 2019/0059232 A1* | 2/2019 | Ricketts ............... A01F 12/444 |
| 2019/0104681 A1 | 4/2019 | Larson et al. |
| 2019/0174674 A1 | 6/2019 | Diessner et al. |
| 2020/0060082 A1 | 2/2020 | Shinners et al. |
| 2020/0107502 A1 | 4/2020 | Mayerle et al. |
| 2020/0296896 A1 | 9/2020 | Mayerle |
| 2020/0323133 A1 | 10/2020 | Anderson et al. |
| 2020/0396904 A1 | 12/2020 | Faulkner et al. |
| 2021/0007277 A1* | 1/2021 | Anderson ............. G05D 1/0088 |
| 2021/0015039 A1 | 1/2021 | Vandike et al. |
| 2021/0034867 A1 | 2/2021 | Ferrari et al. |
| 2021/0195839 A1 | 7/2021 | Koch et al. |
| 2021/0282329 A1 | 9/2021 | Hall |
| 2021/0400870 A1 | 12/2021 | Sunil et al. |
| 2022/0110253 A1 | 4/2022 | Anderson et al. |
| 2022/0132742 A1 | 5/2022 | Faulkner et al. |
| 2022/0153234 A1* | 5/2022 | Shimizu ................ B60W 30/09 |
| 2022/0174873 A1 | 6/2022 | Topmoller et al. |
| 2022/0176917 A1 | 6/2022 | Phinisee et al. |
| 2022/0232768 A1 | 7/2022 | Craig |
| 2022/0273312 A1* | 9/2022 | Goldsmith ............. A61F 2/2476 |
| 2022/0346313 A1 | 11/2022 | Passchyn et al. |
| 2022/0354054 A1 | 11/2022 | Hermann |
| 2022/0361411 A1 | 11/2022 | Mayerle et al. |
| 2022/0361412 A1 | 11/2022 | Duquesne et al. |
| 2022/0369552 A1 | 11/2022 | Christiansen et al. |
| 2022/0369553 A1 | 11/2022 | Christiansen et al. |
| 2022/0369554 A1 | 11/2022 | Christiansen et al. |
| 2022/0375228 A1 | 11/2022 | Christiansen et al. |
| 2022/0394921 A1 | 12/2022 | Missotten et al. |
| 2022/0394923 A1 | 12/2022 | Christiansen et al. |
| 2022/0394924 A1 | 12/2022 | Christiansen et al. |
| 2022/0394925 A1 | 12/2022 | Missotten et al. |
| 2022/0397417 A1 | 12/2022 | Christiansen et al. |
| 2022/0408642 A1 | 12/2022 | Bojsen |
| 2023/0026898 A1 | 1/2023 | Baes et al. |
| 2023/0028281 A1 | 1/2023 | Lorriette |
| 2023/0037095 A1 | 2/2023 | Mayerle |
| 2023/0309449 A1* | 10/2023 | Vandike ............. A01D 41/1278 701/50 |
| 2024/0352079 A1* | 10/2024 | Santos ................... A61Q 17/02 |

FOREIGN PATENT DOCUMENTS

| | | |
|---|---|---|
| CN | 108093830 A | 6/2018 |
| CN | 115128216 A * | 9/2022 ............. B08B 13/00 |
| DE | 102014005904 A1 | 10/2015 |
| DE | 102014014049 A1 | 3/2016 |
| EP | 264764 A2 | 4/1988 |
| EP | 0685151 A1 | 12/1995 |
| EP | 1790207 B1 | 5/2007 |
| EP | 1856966 B1 | 11/2007 |
| EP | 1964465 A2 | 9/2008 |
| EP | 2364587 A1 | 9/2011 |
| EP | 2936962 B1 | 10/2015 |
| EP | 2936961 B1 | 8/2018 |
| EP | 3172959 B1 | 9/2018 |
| EP | 3228174 B1 | 3/2019 |
| EP | 3000302 B1 | 8/2019 |
| EP | 3613272 A1 | 2/2020 |
| EP | 3845050 A1 | 7/2021 |
| EP | 4000373 A1 | 5/2022 |
| EP | 4091422 A1 | 11/2022 |
| EP | 4091423 A1 | 11/2022 |
| EP | 4091424 A1 | 11/2022 |
| EP | 4094564 A1 | 11/2022 |
| EP | 1266553 A2 | 12/2022 |
| EP | 4101282 A1 | 12/2022 |
| EP | 4101283 A1 | 12/2022 |
| EP | 4104665 A1 | 12/2022 |
| EP | 4115723 A1 | 1/2023 |
| EP | 4129044 A1 | 2/2023 |
| GB | 2606740 A | 11/2022 |
| GB | 2606740 A1 | 11/2022 |
| GB | 2606741 A | 11/2022 |
| IN | 202011006479 A | 8/2021 |
| TR | 2022007425 A2 * | 6/2022 |
| WO | 03005803 A1 | 1/2003 |
| WO | 03039238 A1 | 5/2003 |
| WO | 2017075002 A1 | 5/2017 |
| WO | 18076428 A1 | 5/2018 |
| WO | 18162699 A1 | 9/2018 |
| WO | 2022243785 A1 | 11/2022 |
| WO | 2022243786 A1 | 11/2022 |

* cited by examiner

RESIDUE SENSING AND CLEANING SYSTEM

BACKGROUND

The operation and accuracy of sensors can be adversely impacted by the accumulation of residue, including debris, on the sensor. For example, crop residue is often generated via an agricultural operation, such as, for example, a harvesting operation. Such crop residue can include, for example, straw, chaff or other unwanted portions of a crop plant, as well as other biomass such as weeds, weed seeds and the like. Such agricultural operations can also cause other debris, including, for example, dirt and dust, to become displaced or airborne. At least some of the residue, including crop residue and other debris, generated or displaced or both by such agricultural operations can eventually settle on a surface of the sensor through which the sensor receives signals or waves, among other information. The extent such residue accumulates on the sensor, including the level of accumulation over time, can interfere with the sensor receiving signals or waves, including, for example, light. Further, the extent such accumulated residue includes, or is exposed to, moisture can further impact the ability of the sensor to obtain information, as well as be detrimental to attempts to remove such accumulated residue from the sensor.

BRIEF SUMMARY

An aspect of an embodiment of the present disclosure is a method for monitoring an accumulation of a residue on a transmission surface of a sensor of an agricultural machine. The method can include determining whether a first cleanliness value for the transmission surface of the sensor satisfies a first threshold, and generating, in response to determining the first cleanliness value does not satisfy the first threshold, a first signal indicating the accumulation of the crop residue on at least a portion of the transmission surface. The method can also include determining, if the first threshold is not satisfied, whether a second cleanliness value for the transmission surface satisfies a second threshold, the second threshold being different than the first threshold and corresponding to the transmission surface having less accumulated residue than the first threshold.

Another aspect of an embodiment of the present disclosure is a method for monitoring an accumulation of a residue on a transmission surface of a sensor of an agricultural machine and controlling a cleaning of the transmission surface. The method can include determining whether a first cleanliness value for the transmission surface of the sensor satisfies a first threshold, and activating, in response to determining the first cleanliness value does not satisfy the first threshold, an operation of a cleaning system to remove at least a portion of the residue from the transmission surface. Additionally, the method can include determining whether a second cleanliness value for the transmission surface satisfies a second threshold, the second threshold corresponding to the transmission surface having less accumulated residue than the first threshold. Further, in response to determining the second cleanliness value satisfies the second threshold, the operation of the cleaning system can be deactivated.

A further aspect of an embodiment of the present disclosure is a system for monitoring an accumulation of a residue on a transmission surface of a sensor of an agricultural machine that can include a controller having a processor, and a memory coupled with the processor. The memory can include instructions that when executed by the processor can cause the processor to determine whether a first cleanliness value for the transmission surface of the sensor satisfies a first threshold. Further, the processor can generate, in response to a determination that the first cleanliness value does not satisfy the first threshold, a first signal that indicates the accumulation of the residue on the transmission surface, and determine, if the first threshold is not satisfied, whether a second cleanliness value for the transmission surface satisfies a second threshold. Additionally, the first threshold can correspond to a larger accumulation of residue on the transmission surface than the second threshold.

These and other aspects of the present disclosure will be better understood in view of the drawings and following detailed description.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Disclosed are example residue sensing and cleaning systems, methods and machine-readable mediums that monitor residue accumulation on a sensor utilized by an agricultural machine, and use of such residue accumulation information to determine corresponding cleaning actions for the sensor. The disclosed systems, methods and mediums can further determine confidence values for data and signals for a controller of the agricultural machine that are based at least in part on information captured by the sensor at least when one or more transmission surfaces of the sensor is/are at least partially obstructed or obscured by accumulated residue. Examples of sensors can include, but is not limited to, visible light cameras, near-visible light cameras, infrared cameras, optical cameras, thermal imaging cameras, ultrasonic sensors, radar, radar-based cameras, hyperspectral cameras, and light imaging detection and radiation (LIDAR) sensors, among others. The transmission surface can be a surface through which light, sound waves, images, or signals, or combinations thereof, pass through, and are captured or otherwise received by the sensor in connection with the sensor capturing information. Thus, examples of transmission surfaces can include, for example, one or more of a lens, cover, protective film, or shield for the sensor, as well as combinations thereof, among other transmission surfaces. As discussed above, the at least one side or surface of the transmission surface can be positioned to be in direct contact with, or directly exposed to, residue, including, for example, crop residue, dust, dirt, and water, among other residue and debris.

An analytical unit can derive a residue value upon an analysis of the information captured by the sensor. The residue value can correspond to an extent one or more transmission surfaces of the sensor are obstructed by a collection or accumulation of residue on the transmission surface(s). A control unit can utilize the residue value to determine a corresponding cleaning action, if any, for the transmission surface(s) of the sensor. The control unit can also monitor changes in the residue value, as provided by the analytical unit using at least information from images captured by the sensor during performance of the cleaning action. Such changes in the residue value can be utilized by the controller to determine if the aggressiveness of the cleaning operation is to be modified, and when to end the cleaning of the transmission surface(s).

The analytical unit or controller, or both, can utilize captured information from the sensor, or the residue value, or both, to determine a confidence value. The confidence value can correspond to the estimated or anticipated accuracy or reliability of information or data derived using, at least in part, information captured, including received or recorded, by the sensor. Accordingly, in some implementations, whether changes or adjustments in the operation of the agricultural machine are to be made can be based on the degree of the reliability of the associated underlying information, as indicated by the confidence value. Further, as the agricultural machine may utilize a plurality of sensors, whether a change is to be made in the operation of the agricultural machine can be based on the confidence value of a signal that uses information of a particular sensor(s) associated with the information provided in the signal. According to certain embodiments, the controller can adjust a system operation based upon an aggregation of confidence values of signals that used information obtained from sensors positioned at different positions or stages. The derived confidence value can also be influenced, or weighted, by the type of operation that may be adjusted. For example, compared to operations relating to a chopper of a harvester, operations involving automated guidance of the harvester may assign lower confidence values, or apply a different weighted value, to signals when the underlying information was obtained from an at least partially obstructed transmission surface of a sensor. Further, according to certain embodiments, confidence values for sensors that were uninvolved in providing information for a signal that is provided to the controller may not be considered when determining the reliability of that particular signal or whether to adjust an operation of the agricultural machine.

Figure 1:
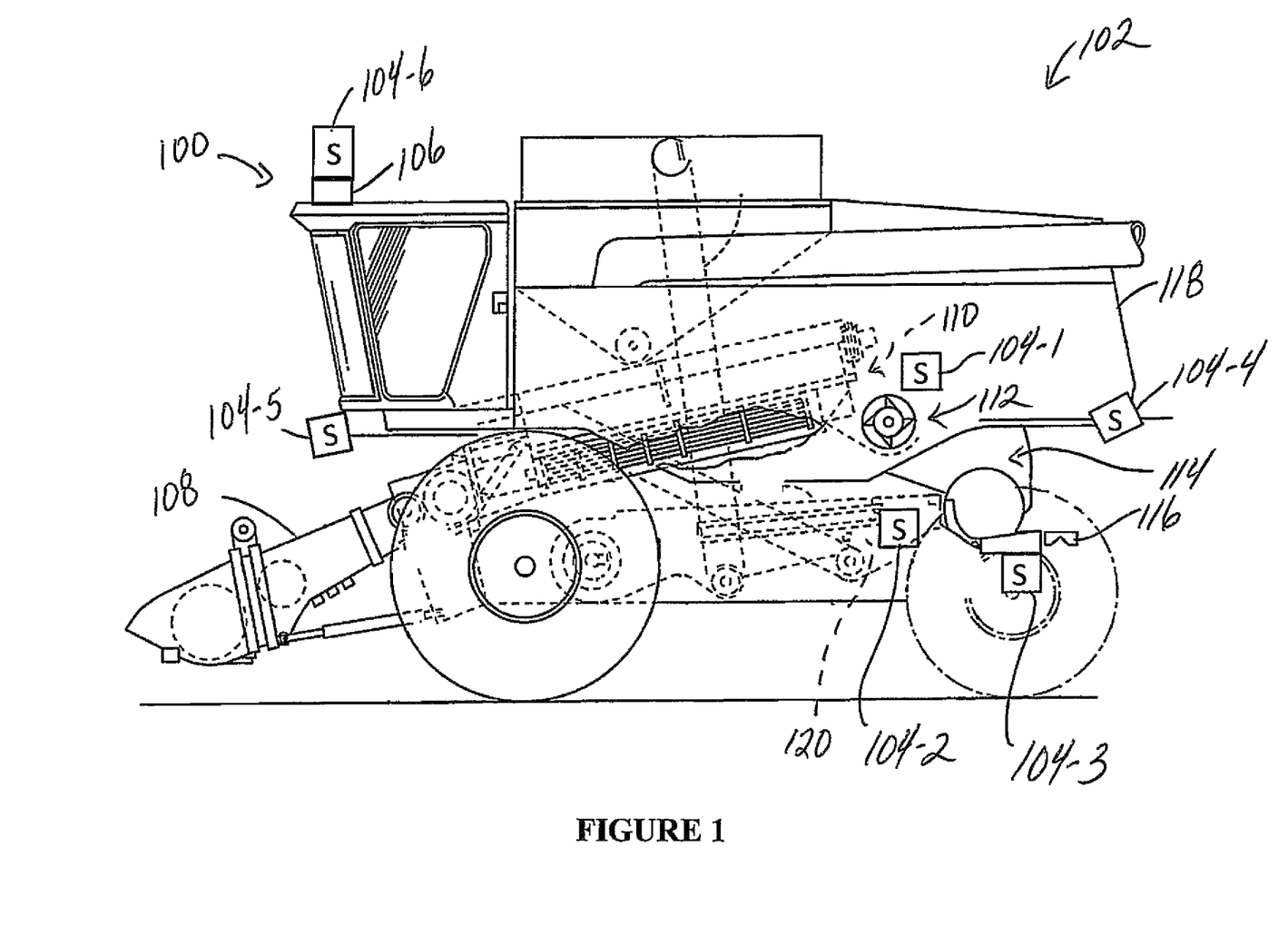
FIG. 1 illustrates an example of a portion of a residue sensing and cleaning system incorporated into an exemplary agricultural machine.

FIG. 1 illustrates a portion of a residue sensing and cleaning system 100 incorporated into an exemplary agricultural machine, which in this example is a harvester 102. The harvester 102 can comprise an agricultural machine that separates crop plants from a growing medium or other crop residue and that further processes the crop plants to separate a targeted portion of the crop plant, such as grain, from unwanted portions of the crop plant, such as straw, chaff or other crop residue. In one implementation, the harvester 102 is a combine harvester that separates grain, such as corn, wheat, oats or the like from the remaining crop residue using a threshing device and a cleaning device. The threshing device can comprise a straw walker or threshing rotor. The cleaning device can comprise a chaffer or sieve through which grain falls and from which crop residue, such as straw are chaff, can be blown rearwardly for discharge and spreading. According to certain embodiments, the harvester 102 can additionally include a chopper that can chop crop residue prior to discharge of the crop residue from the harvester 102.

One or more sensors 104 can be positioned at a variety of locations along the agricultural machine. The sensors 104 can be utilized by, or be part of, one or more systems of an agricultural machine, including for example, part of an optical vision, sensor, or guidance system, as well as combinations thereof, among other systems, of the agricultural machine. Thus, information or data derived from one or more images, videos, waveforms, or signals, or combinations thereof captured, received, or recorded by the sensor 104 (collectively referred to herein as captured information) can be utilized to generate information that can be used by a controller 106 in making decisions regarding the operations performed by, or through use of, the agricultural machine. Thus, in some implementations, the sensor 104 is to capture information that can be used in connection with generating one or more signals for the controller 106 of the agricultural machine, such as, for example, a harvester 102, among other agricultural machines.

As previously mentioned, a variety of different types of devices, as well as combinations of different types of devices, can be utilized for the sensor 104. For example, the sensor 104 can include, but is not limited to, one or more visible light cameras, near-visible light cameras, infrared cameras, optical cameras, thermal imaging cameras, ultrasonic sensors, radar, radar-based cameras, hyperspectral cameras, and light imaging detection and radiation (LIDAR) sensors, among other types of sensors.

The sensors 104 can be located at a variety of positions about the agricultural machine, including within or along exterior portions of the agricultural machine. For example, with respect to embodiments in which the agricultural machine is a combine harvester 102, one or more sensors 104 (generally indicated by "S" in FIG. 1) can be positioned at locations upstream of a feeder house 108 of the harvester 102, at the feeder house, and downstream of the feeder house 108. Additionally, or alternatively, with such harvester embodiments, a sensor 104 can be positioned to capture images of crop residue prior to discharge of the crop residue from the harvester 102. Further, multiple sensors 104, which may or may not, be positioned at similar positions along the agricultural machine, can be utilized to capture images at one or more locations or stages along the agricultural machine.

FIG. 1 provides a non-limiting example of a plurality of sensors 104 positioned at locations both within and outside of a combine harvester 102 to capture information relating to crop residue at various stages or times, including both prior to and following discharge of the crop residue from harvester 102. At least some of the sensors 104 can be secured, or otherwise coupled to, the harvester 102, including, for example, to a frame of the harvester 102. For example a first sensor 104-1 can capture images of crop residue moving between an outlet 110 to a discharge beater 112 and a chopper 114, and which is positioned upstream of a spreader 116. According to certain embodiments, the first sensor 104-1 can be supported by a main frame 118 of the harvester 102 so that the first sensor 104-1 is focused on a region within the harvester 102 between the beater 112 and the chopper 114. Additionally, a second sensor 104-2 can be positioned to capture images of crop residue being blown from a chaffer/sieve 120 towards the chopper 114 and toward the spreader 116. A third sensor 104-3 can be positioned to capture images of crop residue after the crop residue has been chopped by the chopper 114, and prior to the crop residue being discharged and spread by the spreader 116. Additionally, a fourth sensor 104-4 can be positioned to capture images of crop residue that is discharged from the harvester 102, and, moreover, is discharged onto a ground surface outside of the harvester 102. Additionally, a fifth sensor 104-5 can be positioned to capture information regarding crop that is being collected for delivery to the feederhouse, while a sixth sensor 104-6 is positioned to capture information that may be utilized in connection with either, or both, a guidance system and with respect to the position of approaching crop and associated crop rows, among other information. The foregoing however are merely examples of sensor 104 locations, and certain agricultural machines may have one or more sensors 104 positioned at a variety of other locations, including at locations either within, or outside of, the agricultural machine, as well as combinations thereof.

Figure 2:
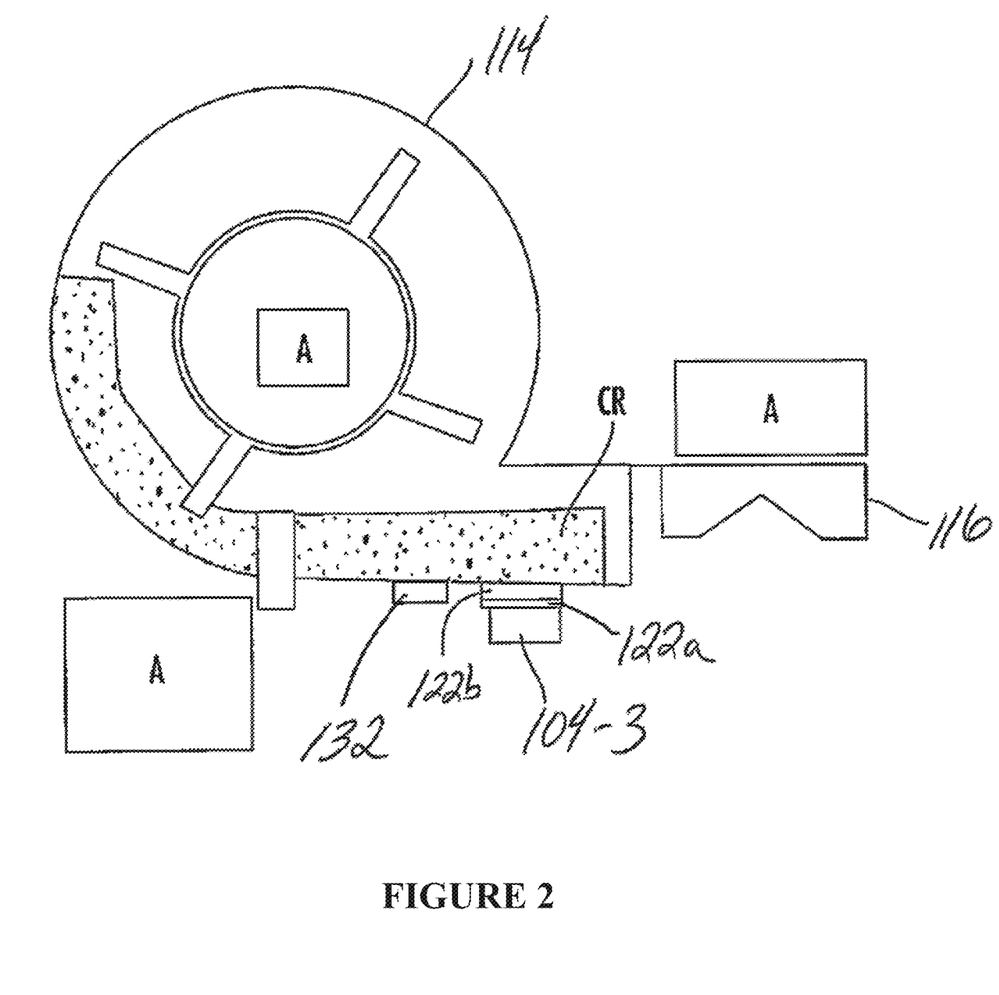
FIG. 2 illustrates an enlarged view of an exemplary sensor that is mounted to a portion of the harvester of FIG. 1.

FIG. 2 is an enlarged view of the exemplary third sensor 104-3, which is in the form of an optical camera. As seen, the sensor 104-3 can be supported between the chopper 114 and the spreader 116, at least the chopper 114 being operably coupled to an actuator ("A"). The illustrated sensor 104-3 can include a first transmission surface 122*a*, such, as for example, a lens or cover of the sensor 104-3, through which at least light, for example, used in obtaining captured information can pass. In the illustrated example, the first transmission surface 122*a* can be an outer generally transparent surface of the sensor 104-3. Optionally, according to certain embodiments, the sensor 104-3 can also include a second transmission surface 122*b* that can be configured to protect the sensor 104-3 from damage related to direct exposure to residue (as indicated by "CR" in FIG. 2), including crop residue, among other residue and debris. For example, according to certain embodiments, the second transmission surface 122*b* can be a transparent protective panel. Such a protective panel can be a separate component through which the sensor 104-3 can capture information of crop residue. Thus, according to certain embodiments, the second transmission surface and be removable and replaceable panel that is positioned between the sensor 104-3 and the crop residue. Further, the second transmission surface 122*b* may or may not, be coupled directly to the sensor 104-3. For example, according to certain embodiments, the second transmission surface 122*b* can be mounted to the frame 118 of the harvester 102 independent of the mounting of the sensor 104-3 to the harvester 102.

Figure 3:
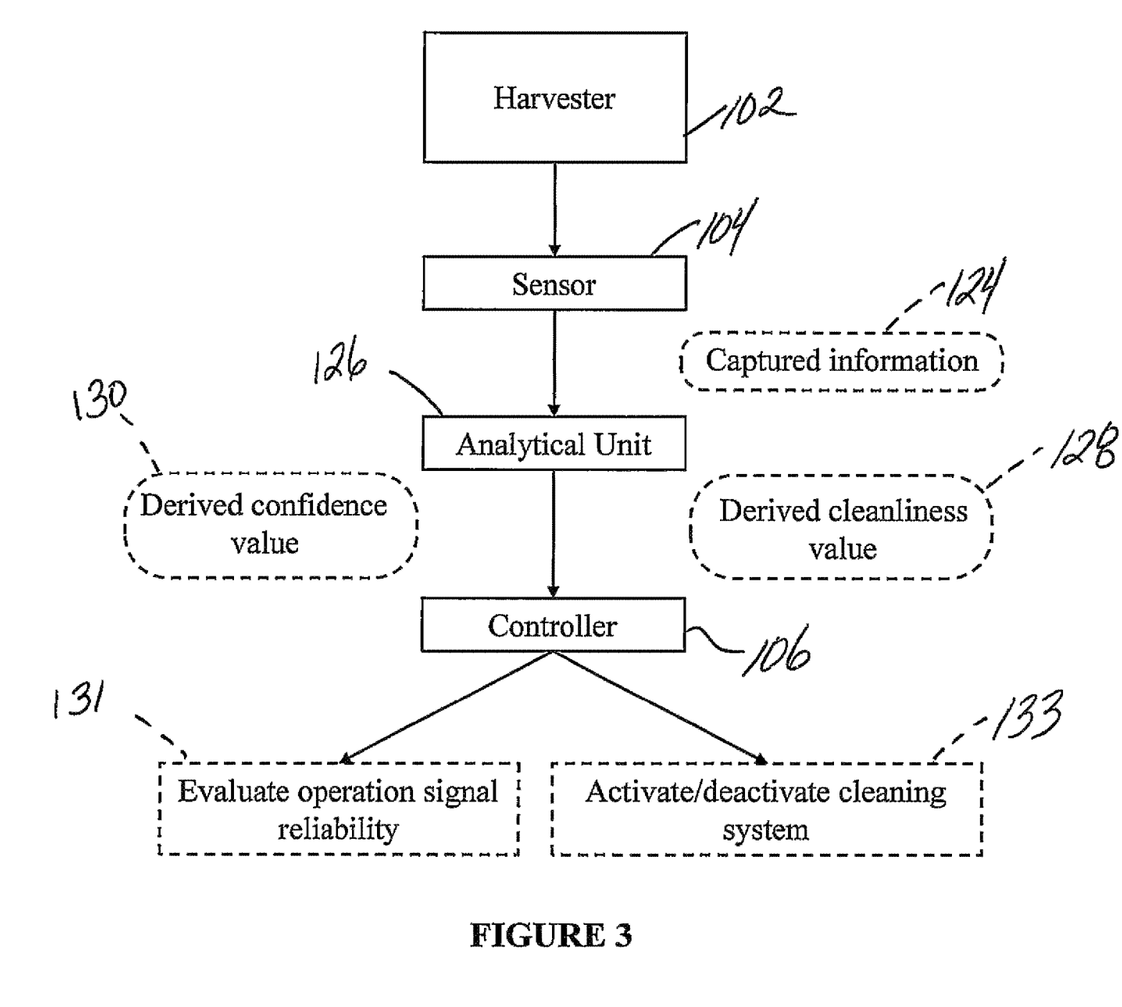
FIG. 3 illustrates a flow diagram of an exemplary method for monitoring residue accumulation on a transmission surface of a sensor and determining whether to adjust field operations based on the extent of the residue accumulation.

FIG. 3 schematically illustrates portions of an exemplary residue sensing and cleaning system 100 that can monitor, as well as clean, accumulated residue on a sensor 104 of an agricultural machine. As indicated above, one or more sensors 104 of an agricultural machine, such as, for example, a harvester 102, can capture information, including, for example, one or more images or videos. An analytical unit 126 of the residue sensing and cleaning system 100 can analyze the captured information 124 to derive a cleanliness value 128 corresponding to the cleanliness, or lack thereof, of the first or second transmission surfaces 122*a*, 122*b* (referred to herein generally as transmission surface 122) of the sensor 104 through which the captured information 124 was obtained. The transmission surface 122 can be a surface through which an image, and moreover, light, passes through to the sensor 104, such as, for example, a lens or protective lens cover. Thus, as previously mentioned, according to certain embodiments, the transmission surface 122 can be positioned to come into direct contact with a flow of residue, including crop residue, among other residue and debris, that is passing into, through, or from the harvester 102.

According to certain embodiments, the cleanliness value 128 can represent the extent, or degree, the transmission surface 122 is covered by, or has accumulated, residue. Additionally, or alternatively, the cleanliness value 128 can correspond to the extent or degree collected residue, which, again, can include materials generated, collected, or displaced while performing an agricultural operation, such as, for example, crop residue, dirt, dust, weeds, or moisture, as well as combination thereof, among other debris, that has accumulated or collected on the transmission surface 122 is/are interfering with the sensor 104 capturing information through at least the transmission surface 122. The cleanliness value 128 can be derived in a variety of different manners. For example, according to embodiments in which the sensor 104 is an optical camera that captures one or more images or videos, the color, or lack thereof, including at pixel level, in the captured images or video can provide an indication of the cleanliness of, or the extent or areas, or both, residue has collected on, the transmission surface 122. Further, a lack of change in color, or lack of color, for at least an area in the capture image(s) or video(s) over a predetermined period of time can provide an indication of the extent or area(s), or both, that residue has collected on the transmission surface 122, which can be used to determine a cleanliness value 128. Additionally, analyzing at least one of color (or lack thereof) and lack of changes in appearance or color in one or more locations in the images or videos captured by the sensor 104 over a period of time can be done, for example, by dissecting the captured images into certain areas or regions or on a pixel level.

A controller 106 can utilize the derived cleanliness value 128 to determine if a first threshold is satisfied. According to certain embodiments, if the first threshold is determined to not be satisfied, such as, for example, the cleanliness value 128 exceeds or correspond to a value outside of the first threshold, the controller 106 can generate a signal to initiate activation of a cleaning system 132 (FIG. 4) to clean the transmission surface 122. The controller 106 can also evaluate captured information 124 obtained over a period of time to determine a rate at which the cleanliness of the transmission surface 122 is changing. Such rate information can be used by the controller 106 to determine an aggressiveness in the cleaning approach that is to be employed by the cleaning system 132 to clean the transmission surface 122 of the sensor 104, as discussed below.

Additionally, or alternatively, according to certain embodiments, if the derived cleanliness value 128 is determined to not satisfy the first threshold, an alert or communication can be provided to the operator of the agricultural machine. Such an alert may be utilized by the operator in determining whether, or whether not, to manually activate a cleaning operation for the transmission surface 122. Thus, according to certain embodiments, a determination that the derived cleanliness value 128 does not satisfy the first threshold may not automatically trigger activation of a cleaning of the transmission surface 122, but instead trigger an alert. According to another embodiment, following the triggering of the alert, the controller 106 may trigger activation of a cleaning of the transmission surface 122 in response to the controller 106 determining that a subsequently derived cleanliness value 128 does not satisfy another threshold that is different than the first threshold.

Thus, in the event the operator does not activate cleaning of the transmission surface 122 in response to the alert relating the first threshold, a subsequent determination by the controller 106 that the derived cleanliness value 128 does not satisfy another threshold may trigger the controller 106 to activate a cleaning operation for the transmission surface 122.

Based at least in part on the extent of a lack of cleanliness of the transmission surface 122, as indicated, for example, by the cleanliness value 128, the controller 106 can determine a confidence value 130 for the captured information 124, or for signals generated using the captured information 124. Moreover, as indicated in FIG. 3 ("Evaluate operation signal reliability" 131), such a confidence value 130 can provide an indication to the controller 106 of the reliability of the corresponding signal, or underlying information, or both. According to certain embodiments, the confidence value 130 can be used by the controller 106 in determining whether the controller 106 is, or is not, to make changes in the operation of the agricultural machine in reliance on such a signal or information. For example, a cleanliness value 128 indicating a high degree of accumulation of residue on the transmission surface 122 can be used to generate a low confidence value 130 in the reliability or accuracy of the captured information 124, or the reliability or accuracy of a signal that is based, at least in part, on the captured information 124. Such a low confidence value 130 can indicate to the controller 106 at least a potential lack of reliability or accuracy of signals generated for the controller 106 that are based at least in part the information from such captured information 124. Moreover, the confidence value 130, among other considerations, including, for example, the nature, importance, or possible impact of changing or not changing the associated operation of the agricultural machine, can be evaluated by the controller 106 in connection with determining whether to change the associated operation.

In instances in which the cleaning system 132 is operating to clean a transmission surface 122 (as generally indicated in FIG. 3 ("Activate/deactivate cleaning system" 133)), such as, for example, in response to a preceding determination that the cleanliness value 128 does not satisfy the first threshold, the controller 106 can evaluate subsequent cleanliness values 128 obtained during the cleaning operation. Such an evaluation can include the analytical unit 126 determining a cleanliness value(s) 128 using captured information 124 that was obtained following initiation of the cleaning of the transmission surface 122. Using such a subsequently obtained cleanliness value(s) 128, the controller 106 can determine if a second threshold has been satisfied, the second threshold indicating that the transmission surface 122 has been cleaned to a predetermined level or degree. According to certain embodiments, the second threshold can be a cleanliness value 128 that is equal to or greater than the cleanliness value 128 associated with the first threshold. Thus, for example, according to certain embodiments, compared to the first threshold, the second threshold can correspond to the transmission surface 122 being cleaner, or having less accumulation or collection of residue.

During such a cleaning process, the controller 106 can also change the confidence value 130 based on the extent the transmission surface 122 is, or is not, becoming cleaner. For example, in the event the rate at which residue is accumulating on the transmission surface 122 is greater than the rate at which the cleaning system 132 is cleaning, if at all, the transmission surface 122, the controller 106 can further lower both the cleanliness value 128 for the transmission surface 122 and the associated confidence value 130 relating to the corresponding captured information 124 or signals using such captured information 124. In such an event, the controller 106 may also adjust the operation of the cleaning system 132, such as increase an aggressiveness of the cleaning operation being performed by the cleaning system 132 to at least attempt to improve the cleanliness and confidence values 128, 130. Conversely, as the transmission surface 122 is cleaned by operation of the cleaning system 132, the controller 106 can increase both the cleanliness and confidence values 128, 130, with cleaning operation ceasing upon the cleanliness or confidence value 128, 130 satisfying a second, predetermined threshold.

Figure 4:
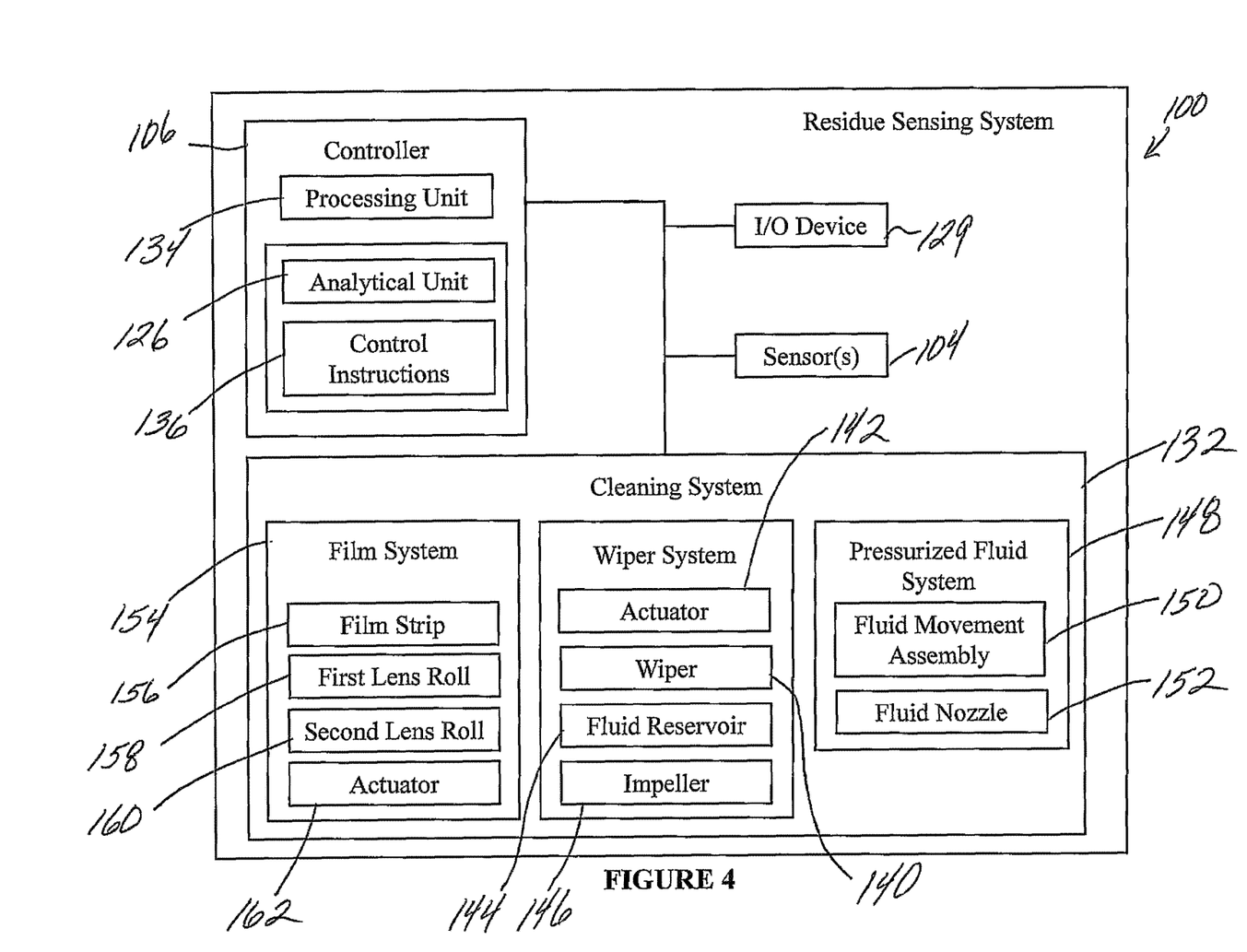
FIG. 4 illustrates a block diagram of an exemplary residue sensing and cleaning system.

FIG. 4 illustrates a block diagram of an example residue sensing and cleaning system 100. As seen, the controller 106 can include a processor 134 that can follow instructions contained on a non-transitory machine-readable medium. According to certain embodiments, the controller 106 is part of the agricultural machine, which, again, in the illustrated embodiment is a harvester 102. The controller 106 can adjust the operational settings of the harvester 102 at a variety of different times, including real-time adjustments while the harvester 102 is operating in a field. Examples of such operations settings include, but are not limited to, guidance or direction of travel of the harvester 102, a speed of travel of the harvester 102, chopper speed, chopper power, harvester feed rate, chopper counter knife position, header height, spreader speeds, spreader vane positions, threshing speed, cleaning speed, threshing clearance, and sieve louver positions, among other operations or settings. In some implementations, the cleanliness values 128, confidence values 130, indications relating to operation of the cleaning system 132, or alerts to the operator, among other information, as well as combinations thereof, can be displayed or otherwise communicated to the operator of the agricultural machine via an input/output (I/O) device 129, such as, for example, via a display, touch screen, or speaker, among other I/O devices 129. Such information can be utilized by the operator in connection with determinations as to what, if any, additional or alternative manual adjustments are to be made to the operation or settings of the harvester 102.

The analytical unit 126 can include a processing unit that follows instructions contained on a non-transitory computer-readable or machine-readable medium. Additionally, the analytical unit 126 can receive the captured information 124 from the sensor 104. Based on an analysis of the captured information 124, such as, for example, an optical analysis, the analytical unit 126 can derive a cleanliness value 128, which, again, can correspond to the extent or degree of residue accumulation on the transmission surface 122 of the sensor 104. According to certain embodiments, cleanliness values 128 can be derived by the analytical unit 126 identifying, via captured information 124, the extent or presence of residue, if any, on individual portions or areas, if not the entirety, of the transmission surface 122 of the sensor 104, and determining cleanliness values 128 for those individual portions, collection of portions, or the entirety of the transmission surface 122. Additionally, or alternatively, the cleanliness values 128 can be derived by the analytical unit 126 identifying individual portions or areas of the captured information 124, if any, in which residue on the transmission surface 122 has interfered with, or obscured, the capturing of information. For example, according to certain embodiments in which the sensor 104 is an optical camera, the analytical unit 126 can evaluate captured information 124 on a pixel level or based on a collection or area(s) of pixels, among other bases for evaluation. Such an evaluation can be based, for example, at least in part on either or both a color and level of light present, or not present, in an area(s) or pixels in captured information 124.

The controller 106 can include control instructions 136 that the controller 106 can utilize in carrying out functions relating to the operation of the agricultural machine, including, for example, operations discussed above with respect to the exemplary harvester 102. According to certain embodiments, the control instructions 136 can, when a confidence value 130 indicates the associated signal is reliable or accurate, at least be used to adjust an operational setting of the harvester 102, as discussed above.

The residue sensing and cleaning system 100 can also include the cleaning system 132. The cleaning system 132 can include components that are configured to clean the transmission surface 122, such as, for example, via removal of accumulated or collected residue from the transmission surface 122. According to certain embodiments, the cleaning system 132 can be adapted to physically contact the transmission surface 122 in a manner that can remove at least a portion of the residue that has accumulated or collected thereon. For example, as seen in FIG. 4, according to certain embodiments, the cleaning system 132 can include a wiper system 138 having a wiper 140 and an actuator 142. A portion of the wiper 140, such as, for example, a wiper blade comprising a rubber strip, can physically contact and travel against at least a portion of the transmission surface 122 in a manner that can remove, clear, or otherwise displace accumulated or collected residue from the transmission surface 122. Such movement of the wiper blade can be facilitated by operation of the actuator 142. According to certain embodiments, the actuator 142 can be an electric motor that is coupled to the wiper 140, including to an arm of the wiper 140. The rate or speed at which the wiper 140 operates, or the frequency at which the wiper blade of the wiper 140 travels across the transmission surface 122, can be controlled via a speed of operation of the actuator 142. Moreover, the controller 106 can increase the aggressiveness at which the wiper system 138 cleans the transmission surface 122 via increasing the speed of the actuator 142, which in turn can increase the frequency or speed, or both, at which the wiper blade of the wiper 140 passes across the transmission surface 122. Conversely, the controller 106 can decrease the aggressiveness of the cleaning done by the wiper system 138 via decreasing the speed of operation of the actuator 142, thereby decreasing the speed or frequency, or both, at which the wiper blade travels across the transmission surface 122.

The cleaning of transmission surface 122 by the wiper 140 can be assisted by depositing a cleaning fluid onto the transmission surface 132. For example, the cleaning system 132 can be configured to selectively spray or otherwise deposit a cleaning fluid onto the transmission surface 122. Thus, according to certain embodiments, the cleaning system 132 can further include a fluid reservoir 144 that can contain such a cleaning fluid. According to certain embodiments, a pump or impeller 146 can be utilized to provide a force to displace the cleaning fluid from the fluid reservoir 144, the impeller 146 including or being fluidly coupled to a nozzle or outlet through which the cleaning fluid can be sprayed or otherwise deposited onto the transmission surface 122.

Alternatively, or additionally, the cleaning system 132 can be a generally contactless cleaning system, such as, for example, a pressurized fluid system 148. According to such an embodiment, residue can be removed from at least a portion of the transmission surface 122 by a fluid, such as, for example, air (among other gases) or liquid, being forcibly directed onto or toward the transmission surface 122. According to such an embodiment, the pressurized fluid system 148 can expel the fluid toward the transmission surface 122 with a force or pressure sufficient to remove collected or accumulate residue, and thus without physical contact of other portions of the pressurized fluid system 148 with the transmission surface 122. For example, according to certain embodiments, the pressurized fluid system 148 can include a fluid movement assembly 150, such as, for example, a high pressure mechanical sprayer or air compressor. Moreover, the fluid movement assembly 150 can include a motor that drives a pump that can compress, pressurize, or accelerate, as well as combinations thereof, fluid. The fluid can then be discharged from the fluid movement assembly 150 and directly or indirectly flow to a fluid nozzle 152 that can direct the fluid generally toward the transmission surface 122. According to certain embodiments, the pressurized fluid system 148 can be used to output fluid at pressures of, for example, around 750 pounds per square inch (psi) to about 30,000 psi. Additionally, as mentioned above, depending on either, or both, the rate at which residue is accumulating on the transmission surface and the lack of cleanliness of the transmission surface 122 (as may be indicated by the cleanliness value 128), among other factors, the controller 106 can set and adjust the aggressiveness at which the pressurized fluid system 148 at least attempts to clean the transmission surface 122. Thus, with respect to the pressurized fluid system 148, adjusting the aggressiveness of the cleaning of the transmission surface 122 can relate to adjusting the pressure at which the fluid is outputted from the pressurized fluid system 148, with an increase in the pressure can correspond to an increase in the aggressiveness of the cleaning.

Alternatively, or additionally, the cleaning system 132 can include a film system 154 that is adapted to at least periodically remove, replace, or change the transmission surface 122. For example, according to certain embodiments, the transmission surface 122 upon which residue accumulates or collects can be, or include, a portion of a film strip 156 that extends between a first lens roll 158 and a second lens roll 160, with other portions of the film strip 156 either being positioned around the first or second roll 158, 160. According to such an embodiment, the film strip 156 can have a length such that portions of the film strip that were exposed to residue can be replaced by other portions of the film strip that had been at a location at which those replacement portions of the film strip were at least partially shielded from exposure to residue. Such a configuration can allow a portion of the film strip 156 to be generally adjacent to, over, or protect the sensor 104 from being directly exposed to residue, while other, unused portions of the film strip 156 can be wrapped around the first lens roll 158 at a location that can generally shield the unused portion of the film strip 156 from the residue. Accordingly, while residue can accumulate or collect on the portion of the exposed film strip 156, the wrapped portion of the film strip 156 can remain generally clean. In the event the controller 106 determines the film strip 156 is to be cleaned, the controller 106 can actuate an actuator 162, such as, for example, an electric motor, that is coupled to either, or both, the first or second roll 158, 160. Actuation of the actuator 162 can facilitate the dirty, exposed portion of the film strip 156 being moved or wrapped onto the second lens roll 160. Such displacement of the user portion of the film strip 156 can coincide with another portion of the film strip 156 that had been wrapped about the first lens roll 158 being moved to the position that had been occupied by the exposed, and now dirty, portion of the film strip 156. Thus, a cleaner portion of the film strip 156 can be moved to replace the previously exposed, and dirtier portion of the film strip 156. According to such an embodiment, the film strip 156, and, optionally, at least one of the first and second rolls 158, 160, can occasionally be replaced with another, cleaner film strip 156.

While the wiper system 138, pressurized fluid system 148, and film system 154 are discussed above individually, the cleaning system 132 can be comprise any combination as such systems 138, 148, 154, as well any such systems 138, 148, 154 in combination with other forms of cleaning systems or devices. Further, according to certain embodiments, the aggressiveness at which the cleaning system 132 operates can be adjusted by changing from using one type of system 138, 148, 154, to at least one other type of system 138, 148, 154, or changing the number of systems 138, 148, 154 being used simultaneously or in conjunction with another system(s) 138, 148, 154.

Figure 5:
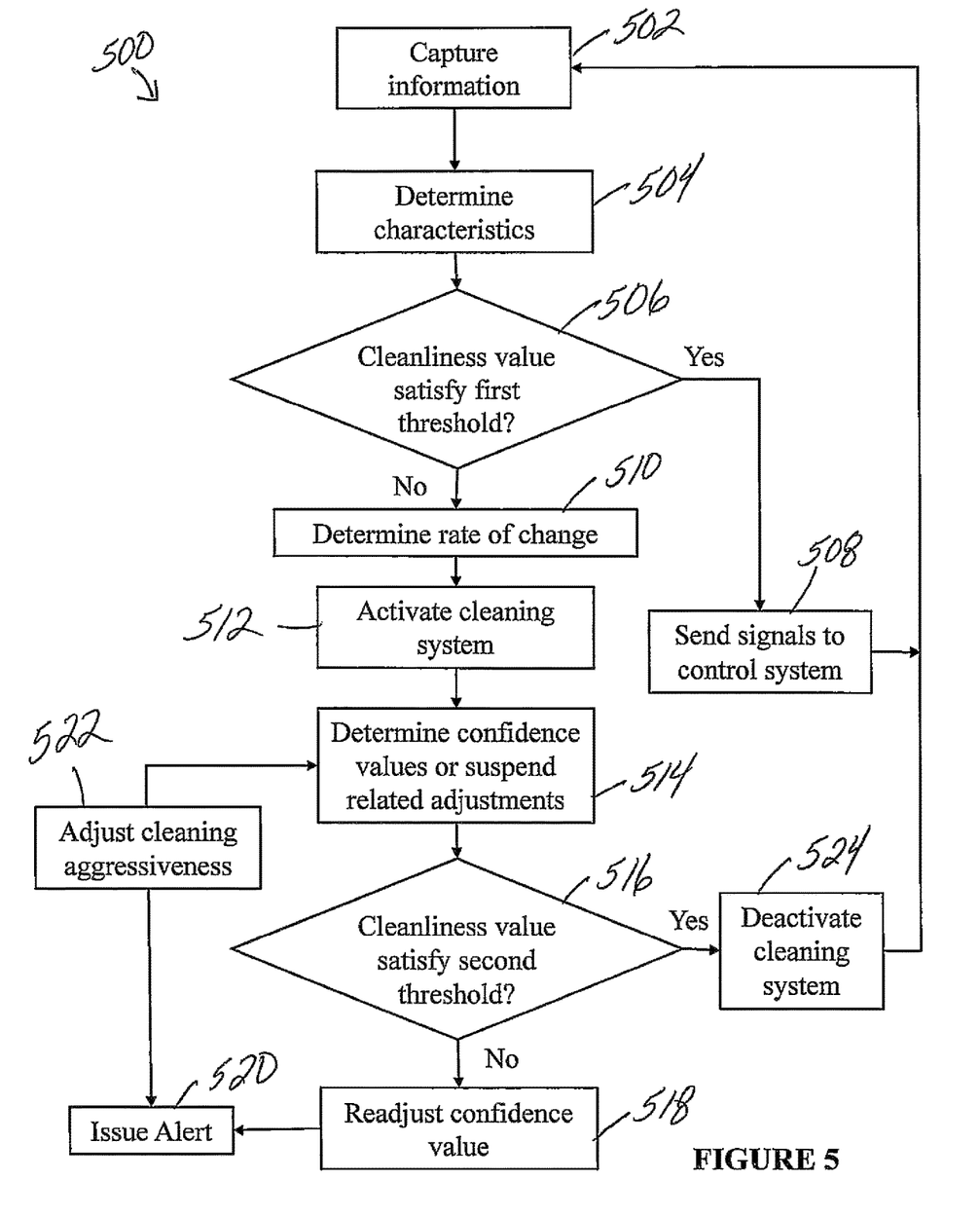
FIG. 5 illustrates a flow diagram of an exemplary method for operating the illustrated residue sensing and cleaning system.

FIG. 5 is a flow diagram of an exemplary method 500 for operating the illustrated residue sensing and cleaning system 100. The method 500 is described below in the context of being carried out by the illustrated exemplary residue sensing and cleaning system 100. However, it should be appreciated that method 500 may likewise be carried out by any of the other described implementations, as well as variations thereof. Further, the method 500 corresponds to, or is otherwise associated with, performance of the blocks described below in the illustrative sequence of FIG. 5. It should be appreciated, however, that the method 500 can be performed in one or more sequences different from the illustrative sequence.

At block 502, the sensor 104 can capture information associated with an operation of the agricultural machine. As discussed above, the captured information can be used in connection with generating one or more signals associated with the operation of the agricultural machine. Additionally, as also discussed above, the captured information 124 can be analyzed by the analytical unit 126 in connection with determining an associated cleanliness value 128 for a transmission surface 122 of the sensor 104.

At block 506, the controller 106 can determine whether the cleanliness value 128 derived at block 504 does, or does not, satisfy a first threshold. If the cleanliness value 128 is determined at block 506 to satisfy the first threshold, such as, for example, corresponds to a value within the first threshold, then the transmission surface 122 can be deemed to have sufficient cleanliness such that the associated captured information, or signals generated using such captured information, can be deemed accurate or reliable. For example, according to certain embodiments, satisfaction of the first threshold can correspond to at least a certain percentage, such as, for example 60%, of the transmission surface 122 or associated captured information not being blocked or obscured by accumulated residue. Moreover, the cleanliness value 128 satisfying the first threshold can provide an indication that, to the extent residue has, if at all, collected on the transmission surface 122, such collected residue is not interfering with the sensor 104 obtaining accurate or reliable captured information. Thus, as signals generated for the controller 106 using such collected information can be deemed reliable, at block 508 such signals can be communicated to the controller 106. The method 500 can then be repeated for subsequently obtained captured information.

If, however, at block 506 the controller 106 determines the cleanliness value 128 does not satisfy the first threshold, then, according to certain embodiments, at block 510 the controller 106 can determine the rate at which the cleanliness value 128 is changing, or the rate at which residue is accumulating or collecting on the transmission surface 122. For example, according to certain embodiments, the controller 106 can evaluate changes between a present cleanliness value 128 and one or more cleanliness values 128 that were obtained at different times. Alternatively, or additionally, the controller 106 can evaluate changes in derived cleanliness values 128 over one or more predetermined periods of time.

At block 512, the controller 106 can activate the cleaning system 132 so that the cleaning system 132 can begin cleaning the transmission surface 122. Activation of the cleaning system 132 at block 512 can also include determining the aggressiveness of the cleaning operation of the cleaning system 132. Such an aggressiveness determination can be based at least in part on the information obtained at block 510 regarding the rate at which the cleanliness value 128 is changing, or decreasing, among other information indicating the rate at which residue is accumulating or collecting on the transmission surface 122.

At block 514, the controller 106 can determine confidence values 130 for a signal(s) that may be received by, or is/are sent to, the controller 106 at least during the time period at which the cleanliness value 128 of the transmission surface 122 does not satisfy the first threshold. As previously discussed, such a confidence value(s) 130 can be based, at least in part, on the associated cleanliness value 128 at the time the sensor 104 obtained the captured information. Moreover, again, such a confidence value 130 can provide an indication to the controller 106 as to whether an agricultural operation is to be adjusted based in reliance, at least in part, on the associated signal.

Alternatively, according to certain embodiments, rather than determining a confidence value at block 514, upon the first threshold not being satisfied, the controller 106 may at least temporarily pause, suspend, or cease making changes to operation of the agricultural machine that would be based, at least in part, on information from the associated sensor 104. Further, according to certain embodiments, such stoppage in adjustments could end when the cleanliness value 128 does satisfy the first threshold or satisfies a threshold other than the first threshold. For example, according to certain embodiments, such adjustments can resume upon the cleanliness value 128 satisfying the first threshold, but before the cleanliness value 128 satisfies the below-discussed second threshold. Additionally, according to certain embodiments, signals generated using the associated captured information pertaining to adjustments in an operation of the agricultural machine can resume, and confidence values 130 can be utilized in connection with determining whether the controller 106 should, or should not, make such adjustments. Moreover, although adjustments to operations using such underlying captured information 124 can resume, according to certain embodiments, confidence values 130 may still be employed in connection with the controller 106 determining whether such adjustments should, or should not, be made.

The controller 106, or analytical unit 126, can be adapted to continuously, or at least periodically, evaluate and adjust the cleanliness value 128 for a transmission surface 122 or the associated captured information 124. According to certain embodiments, such reevaluation of the cleanliness value 128 can generally be continuous, occur at predetermined time intervals, or occur after one or more time lapses since initiation of a cleaning operation for the transmission surface 122. Alternatively, according to certain embodiments, reevaluation of the cleanliness value 128 can occur after a predetermined number of cycles of operation of the cleaning system 132, or cycles of operation of an operation of the agricultural machine. For example, according to certain embodiments in which the cleaning system 132 is a wiper system 138, such reevaluation of the cleanliness value 128 can occur after the wiper blade of the wiper 140 has passed across the transmission surface 122 a preset number of times. Additionally, or alternatively, the cleanliness value 128 can be reevaluated based on an operation(s) of the agricultural machine, such as, for example, an amount of crop harvested by a harvester 102, among other operations.

Thus, even during, or before, the cleaning of the transmission surface 122 at block 512, the analytical unit 126 can be continuously, or regularly, determining cleanliness values 128, or changes in such values. According to certain embodiments, the analytical unit 126 can evaluate one or more images captured after the capturing of the image(s) associated with the cleanliness value 128 that did not satisfy the first threshold at block 506.

The determination and evaluation of subsequent cleanliness values 128 can also provide an indication as to whether the aggressiveness of the cleaning operation is to be adjusted by the controller 106. For example, in at least certain situations, cleanliness values 128 derived while the cleaning system 132 is cleaning the transmission surface 122 can provide an indication as to whether the rate at which the transmission surface 122 is being cleaned should be adjusted. More specifically, for example, such information can indicate whether the cleaning operation is to be increased so as to be faster, or faster by a predetermined amount, than the rate at which residue is accumulating or collecting on the transmission surface 122. Additionally, or alternatively, the rate at which the cleanliness value 128 may or may not, be changing can provide an indication of a malfunction in the cleaning system 132, or that some other external factor is adversely impacting the efficiency of the cleaning, such as, for example, crop moisture. Using such information, the controller 106 can adjust the operation of the cleaning system 132, such as to increase the aggressiveness in the cleaning operation or change to a different type of cleaning system 138, 148, 154. Alternatively, cleanliness values 128 obtained during the cleaning operation can indicate that the cleaning operation is outpacing the rate at which residue is accumulating or collecting on the transmission surface 122 by an extent or degree that may warrant a decrease in the aggressiveness of the cleaning operation.

At block 516, the cleanliness value(s) 128 attained during the cleaning operation can be evaluated to determine if the cleanliness value 128 satisfies a second threshold. As previously mentioned, relative to the first threshold, the second threshold can be associated with the sensor 104 being generally clean or cleaner. Thus, according to certain embodiments, the second threshold can be different than the first threshold, and moreover, associated with a higher level of cleanliness of, or less accumulated or collected residue on, the transmission surface 122.

If the second threshold is not satisfied, then at block 518, the controller 106 can adjust the confidence level 130 for signals generated using information from the associated sensor 104. As the second threshold is a higher or stricter threshold than the first threshold, in some instances, the adjustment of the confidence value 130 can correspond to an indication that the captured information 124 currently being obtained by the sensor 104 is anticipated to be more accurate or reliable than captured information 124 that was being obtained at least at the time the determination was made at block 506 that the first threshold was not satisfied. Alternatively, in the event the aggressiveness of the cleaning operation was insufficient to overcome the rate at which residue is accumulating or collecting on the transmission surface 122, and the transmission surface 122 has thus become even dirtier, the confidence value 130 can be decreased at block 518. In other situations, the evaluation at block 518 can result in maintaining the confidence value 130 that was attained at block 514. Further, according to certain embodiments, in at least situations in which the confidence value 130 is decreased at block 518, at block 520 an audible, visual, or haptic alert, or any combination thereof, can be communicated to an operator of the agricultural machine, which may for example, provide a warning of a possible malfunction with the cleaning system 132. Additionally, according to certain embodiments, the aggressiveness of the cleaning operation can be increased at block 522. Such an increase in cleaning aggressiveness may be at least an attempt to subsequently attain a cleanliness value 128 that will, upon a reevaluation, satisfy the second threshold.

However, if the current cleanliness value 128 is determined to satisfy the second threshold at block 516, then at block 524 the operation of the cleaning system 132 can be deactivated. Alternatively, in response to satisfaction of the second threshold, at block 524 the aggressiveness in the operation of the cleaning system 132 can be reduced. Thus, for example, according to certain embodiments, in response to satisfaction of the second threshold, the frequency, speed, or force, as well as combinations thereof, at which the cleaning system 132 is operating, can be reduced. The method 500 can then return to monitoring whether subsequently captured images indicate that the cleanliness value 128 of the transmission surface 122, or the capture information that was transmitted through the transmission surface 122, does, or does not, satisfy the first threshold, wherein the above-discussed method 500 can then be repeated.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

The invention claimed is:

1. A method for monitoring an accumulation of a residue on a transmission surface of a sensor of an agricultural machine, the method comprising:

analyzing a first information captured by the sensor to determine a first value corresponding to at least one of (1) the accumulation of the residue on the transmission surface, and (2) an interference of the residue with the sensor capturing the first information through at least the transmission surface;
determining whether the first value satisfies a first threshold;
generating, in response to determining the first value does not satisfy the first threshold, a first signal indicating the accumulation of the residue on at least a portion of the transmission surface;
analyzing a second information captured by the sensor, after the generating of the first signal, to determine a second value corresponding to at least one of (1) the accumulation of the residue on the transmission surface, and (2) an interference of the residue with the sensor capturing the first information through at least the transmission surface;
determining whether the second value for the transmission surface satisfies a second threshold, the second threshold being different than the first threshold; and
automatically activating, in response to the second value being determined to not satisfy the second threshold, an operation by a cleaning system of the agricultural machine.

2. The method of claim 1, wherein the first signal is a notification for an operator of the agricultural machine of the accumulation of the residue.

3. The method of claim 1, further including ceasing, in response to determining the first value does not satisfy the first threshold, communications of signals generated using information captured by the sensor that pertains to adjusting an operation of the agricultural machine.

4. The method of claim 3, further including resuming, in response to determining the second value satisfies the second threshold, communications of signals generated using information captured by the sensor that pertains to adjusting the operation of the agricultural machine.

5. The method of claim 1, further including determining, in response to determining the first value does not satisfy the first threshold, a first confidence value for another signal generated using the first information captured by the sensor.

6. The method of claim 5, further including, determining, based on the first confidence value, to either adjust or not adjust an operation of the agricultural machine using the first signal.

7. A method for monitoring an accumulation of a residue on a transmission surface of a sensor of an agricultural machine and controlling a cleaning of the transmission surface, the method comprising:
determining whether a first value for the transmission surface of the sensor satisfies a first threshold, the first value being determined from a first information captured by the sensor;
activating, in response to determining the first value does not satisfy the first threshold, an operation of a cleaning system to remove at least a portion of the residue from the transmission surface;
determining whether a second value for the transmission surface satisfies a second threshold, the second value being determined from a second information captured by the sensor, the second threshold corresponding to the transmission surface having less accumulated residue than the first threshold; and
deactivating, in response to determining the second value satisfies the second threshold, the operation of the cleaning system.

8. The method of claim 7, further including:
determining, in response to determining the first value does not satisfy the first threshold, a first confidence value for a first signal generated using captured information by the sensor;
determining, after activating the operation of the cleaning system, a second confidence value for a second signal generated using information captured by the sensor, the second confidence value being different than the first confidence value, and
determining, based on the second confidence value, whether adjust an operation of the agricultural machine using the second signal.

9. The method of claim 7, further including:
determining a rate at which the residue is collecting on the transmission surface, and
determining, using at least the rate, a cleaning aggressiveness for the operation of the cleaning system.

10. The method of claim 7, further including:
determining, during the operation of the cleaning system, a rate at which the residue is being either removed from, or collecting on, the transmission surface; and
adjusting, based at least on the rate, a cleaning aggressiveness for the operation of the cleaning system.

11. A system for monitoring an accumulation of a residue on a transmission surface of a sensor of an agricultural machine, the system comprising:
the sensor;
a cleaning system;
a controller having a processor; and
a memory coupled with the processor, the memory including instructions that when executed by the processor cause the processor to:
determine whether a first value for the transmission surface of the sensor satisfies a first threshold, the first value determined from a first information captured by the sensor and indicative of the accumulation of the residue on the transmission surface;
generate, in response to a determination that the first value does not satisfy the first threshold, a first signal that indicates the accumulation of the residue on the transmission surface;
determine, if the first threshold is not satisfied, whether a second value for the transmission surface satisfies a second threshold, the second value determined from a second information captured by the sensor after the sensor captures the first information and indicative of the accumulation of the residue on the transmission surface, the first threshold corresponding to a larger accumulation of residue on the transmission surface than the second threshold; and
automatically activate, in response to a receipt of at least one of the first signal and the second signal, an operation of the cleaning system to remove at least a portion of the residue from the transmission surface.

12. The system of claim 11, wherein the first signal is a notification for an operator of the agricultural machine of the accumulation of the residue.

13. The system of claim 11, wherein the processor is further configured to suspend, in response to the determination that the first value does not satisfy the first threshold, communication of a signal generated using information captured by the sensor that pertains to an adjustment of an operation of the agricultural machine.

14. The system of claim 13, wherein the processor is further configured to resume, in response to the determination that the second value satisfies the second threshold, communication of another signal generated using information captured by the sensor that pertains to the adjustment of the operation of the agricultural machine.

15. The system of claim 11, wherein the processor is further configured to determine, in response to the determination that the first value does not satisfy the first threshold, a first confidence value for a first signal generated using captured information from the sensor.

16. The system of claim 15, wherein the processor is further configured to determine, based on the first confidence value, to either adjust or not adjust an operation of the agricultural machine using the first signal.

17. The system of claim 16, wherein the first signal activates the operation of the cleaning system, and wherein the processor is further configured to:

determine, after the operation of the cleaning system is activated, a second confidence value for a second signal, the second confidence value being different than the first confidence value, and determine, based on the second confidence value, to either adjust or not adjust the operation of the agricultural machine using the second signal.

18. The system of claim 11, wherein the processor is further configured to:

determine a rate at which the residue is collecting on the transmission surface, and determine, using at least the rate, a cleaning aggressiveness for the operation of the cleaning system.

19. The system of claim 11, wherein the processor is further configured to:

compare, during the operation of the cleaning system, a rate at which the residue is being either being removed from, or being collected on, the transmission surface; and adjust, in response to an outcome of the comparison, a cleaning aggressiveness for the operation of the cleaning system.

20. The system of claim 11, wherein the second captured information is obtained after activation of the operation of the cleaning system in response to the receipt of the first signal.

* * * * *